(12) United States Patent
Davenport et al.

(10) Patent No.: US 6,688,303 B2
(45) Date of Patent: Feb. 10, 2004

(54) METHOD AND SYSTEM FOR CONTROLLING OPERATION OF AN ENERGY CONVERSION DEVICE

(75) Inventors: Roger L. Davenport, Golden, CO (US); David C. Smith, Youngstown, OH (US)

(73) Assignee: Science Applications International Corporation, San Diego, CA (US)

( * ) Notice: Subject to any disclaimer, the term of this patent is extended or adjusted under 35 U.S.C. 154(b) by 97 days.

(21) Appl. No.: 09/996,181

(22) Filed: Nov. 28, 2001

(65) Prior Publication Data

US 2003/0121514 A1 Jul. 3, 2003

Related U.S. Application Data

(63) Continuation-in-part of application No. 09/887,631, filed on Jun. 22, 2001.

(51) Int. Cl.[7] ............... F03G 6/00; F24J 2/46; F24J 2/40
(52) U.S. Cl. ........... 126/570; 126/572; 126/589; 126/599; 126/600; 126/683; 126/684; 60/641.8
(58) Field of Search ............... 126/570, 572, 126/589, 599, 600, 680, 683, 684, 694; 60/641.11, 641.15, 641.8; 136/244

(56) References Cited

U.S. PATENT DOCUMENTS

| | | | | |
|---|---|---|---|---|
| 4,249,083 A | * | 2/1981 | Bitterly | 290/1 R |
| 4,334,521 A | * | 6/1982 | Jacoby | 126/574 |
| 4,339,627 A | * | 7/1982 | Arnould | 136/259 |
| 4,354,484 A | * | 10/1982 | Malone et al. | 126/602 |
| 4,440,150 A | * | 4/1984 | Kaehler | 126/602 |
| 5,459,996 A | * | 10/1995 | Malloy et al. | 60/200.1 |
| 5,787,878 A | * | 8/1998 | Ratliff, Jr. | 126/680 |
| 6,448,489 B2 | * | 9/2002 | Kimura et al. | 136/244 |

FOREIGN PATENT DOCUMENTS

EP 0163801 * 11/1985

OTHER PUBLICATIONS

Solar Energy International Company, Ltd. brochure on dish/Stirling solar power system, Mar. 1996.

* cited by examiner

Primary Examiner—Alfred Basichas
(74) Attorney, Agent, or Firm—Kilpatrick Stockton LLP

(57) ABSTRACT

A method and system is described for controlling a solar collector. A microprocessor receives inputs from one or more sensors in the system and determines the level of operation of an energy conversion device. If the level of operation reaches a predetermined setpoint below a maximum level at which the device is to operate, a variable focus solar concentrator is defocused to reduce energy input into the energy conversion device. When the system cools down and operates at a second predetermined level, lower than the first predetermined level, the concentrator is then refocused to increase the power input to the energy conversion device.

20 Claims, 6 Drawing Sheets

METHOD AND SYSTEM FOR CONTROLLING OPERATION OF AN ENERGY CONVERSION DEVICE

CROSS REFERENCE TO RELATED APPLICATIONS

This application is a continuation-in-part of application Ser. No. 09/887,631 filed Jun. 22, 2001, and entitled "Method and System for Controlling a Solar Collector." This application claims priority to the filing date of parent application Ser. No. 09/887,631, and the entire disclosure thereof is specifically incorporated by reference herein.

1. FIELD OF THE INVENTION

The invention relates to a system and method for controlling a solar collector or solar concentrator. More specifically, the system and method relate to a controller system and associated software for accepting sensor inputs from sensors on the solar collector to determine the state of operation of an energy conversion device associated with the concentrator. In particular, the sensors provide information relative to the energy conversion device operating above a certain capacity, indicated, for example, by overheating, and the controller system issues commands to control the focusing of the solar collector, and executing instructions based on the energy conversion device condition to avoid operation above a desired capacity, while maintaining the energy conversion device online and operational.

2. BACKGROUND OF THE INVENTION

Solar collector or concentrator systems are used to collect solar energy from sunlight and convert it to a usable form of energy. The terms "solar collector," "solar concentrator," "collector," "concentrator," and "solar dish" or "dish" are used interchangeably herein to indicate the collector and concentrator portion of the solar collector, although, as would be understood by one of ordinary skill in the art, a solar collector or concentrator is not necessarily dish-like in shape.

One example of converting solar energy to usable energy is that solar energy may be stored in a battery for future use, or it may be used to generate power using a solid state device or an engine system. Such devices are referred to herein as a Power Conversion System ("PCS"). One such engine system commonly used in solar collector systems is a Stirling engine, which is a type of engine that derives mechanical power from the expansion of a confined gas at a high temperature. However, the system and method disclosed herein may be adapted for use with any PCS.

For example, other types of PCS's may include photovoltaic cells which convert light energy into electricity. For purposes of this description, all such types of PCS systems and devices are generally referred to herein as "energy conversion device(s)."

Solar collector systems typically include motion controlling systems to change the orientation of the collector. As the sun moves across the sky, the solar collector orientation must be changed accordingly to track the position of the sun by compensating for the earth's rotation. One complication arising from the use of solar collectors or concentrators is that high wind conditions may cause damage to solar collector systems because solar collectors are typically placed on a pedestal above the ground. Therefore, to avoid such damage, the solar collector is normally lowered or stowed in a safer orientation if high wind conditions exist.

The motors and drive systems used to control the orientation of a solar collector system may be controlled electronically by some combination of manual commands entered by a user. Alternatively, sensors may be placed to monitor various conditions of the solar collector, and a microprocessor may issue commands to change the orientation of the solar collector system based on the sensor inputs.

Current programming techniques used on such microprocessors are based on a hierarchical methodology. As used herein, the terms "program algorithm," "program routine," "program subroutine," "algorithm," "routine," and "subroutine" are used interchangeably to refer to any block of code that may be logically grouped together and may or may not use the conventional subroutine interfaces as defined by typical programming languages. As would be understood by one of ordinary skill in the art, a program routine or subroutine is generally understood as a stylistic convention of programming, and thus different routines or subroutines may be written in multiple combinations and accomplish the same function. Thus, as used herein, a program algorithm, routine or subroutine encompasses any block of code logically grouped together regardless of whether conventional subroutine interfaces, as defined by typical programming languages, are used.

In a hierarchical program, the programming algorithm operates in a sequential manner, and the orientation of the solar collector is known to a system operating in accordance with the algorithm, based on previously issued commands. For example, the programming algorithm is initialized to certain starting parameters to indicate the starting orientation of the solar collector. If a user enters a command to place the solar collector into an operational state, the system implementing the programming algorithm issues instructions to the motors and drive systems to move a given direction in order to be placed in operational orientation. If the solar collector is moved again, for example, to track the sun, the information from the previously executed commands is used to determine what commands must be issued to re-orient the solar collector. By "state" or "collector state" is meant the combination of all the known status indicators of the collector, which may include positional orientation, temperature, wind conditions, etc.

If an error in the system occurs, it is difficult or impossible to issue new commands correctly. That is, if the program implementing the algorithm is unable to determine the correct orientation of the solar collector from its past history, it cannot accurately issue new commands or instructions. Error detection is also difficult in such a system. If the program implementing the algorithm has an error, it will continue to operate even though it may be issuing commands based on incorrect assumptions about the solar collector orientation. If such a system is turned off and restarted in mid-operation, the program routine does not have correct starting parameters, and therefore, is unable to issue correct control commands.

One particular type of solar collector system currently in use involves the use of a concentrator having stretched membrane mirror facets. Such systems have been installed and are known commercially by the name SunDish™. Such systems have been operationally installed through the cooperation of The Salt River Project (SRP), Science Applications International Corporation (SAIC), STM Corporation and the U.S. Department of Energy. Further details about such a system are disclosed in a document entitled The Salt River Project SunDish™ dish-Stirling System, authored by Jessica Mayette (Salt River Project), Roger L. Davenport and Russell Forristall (SAIC).

Such a concentrator typically has 16 round, stretched membrane mirror facets. The stretched membrane mirror facets consist of a rolled steel ring with stainless steel membranes welded to the front and back surfaces of the ring.

Thin, typically 1-mm, low-iron glass mirrors, attached with adhesive to the front membrane, provide the reflective surface. The facets are focused by pulling a slight vacuum between the membranes using a blower system. Such a system allows fine-tune adjustment of the focal length during alignment of the system.

The use of such membranes, however, may give rise to complications in operation. More specifically, in the case of dish-engine systems where an energy conversion device such a Stirling engine is used, it is normally desirable to operate the engine near its peak power point to optimize efficiency. However, solar energy varies seasonally and over the course of the day. If the engine cannot accept the power available from the concentrator at any given time, due to optional focusing at high solar radiation levels, it will overheat.

One solution has been to off-track, i.e., no longer track the sun, with the dish, but this drops system output to zero, and may overheat other components that the beam tracks across. The other solution is to oversize the engine relative to the dish so that it never sees more power from the dish than it can handle. This is costly, and leads to lower system efficiency since the engine operates lower on its power curve most of the time.

Such overheating can also occur in the case where a concentrator includes fixed focus mirrors and the power input to an energy conversion device exceeds a predetermined amount. As noted, such energy conversion devices can also include photovoltaic devices, as contrasted with Stirling engines, where voltage output monitored exceeding a predetermined value, i.e., overpowering, may indicate an overheating condition.

In accordance with the system and method described herein, these and other problems are avoided by providing a disk system which allows for operation of an engine conversion device near its peak, or other desired level, and controls or avoids overheating while continuing to maintain the dish system operational with power output continuing from the energy conversion device.

SUMMARY OF THE INVENTION

In one aspect the invention relates to a system for controlling a solar concentrator. The system includes a concentrator having multiple mirrors and an energy conversion device, such as a Stirling engine or photovoltaic array, associated with the solar concentrator for having sunlight reflected from the multiple mirrors focused thereon. An arrangement is provided for focusing and defocusing the multiple mirrors of the solar concentrator on the energy conversion device. A sensor serves to monitor the operation of the energy conversion device to provide an output indicative of whether the amount of solar energy focused on the device is at a maximum amount or other predetermined level at which the energy conversion device is to operate. A controller system serves to control the operation of the solar concentrator, the multiple mirrors, and the energy conversion device. The controller system is configured for comparing the output of the sensor with a first predetermined value below the value indicative of the solar energy focused on the energy causing operation of the energy conversion device at a maximum or other predetermined level at which it is to operate, and serves to either focus or defocus at least one of the multiple mirrors to cause the output of the sensor to fall below the first predetermined value. The controller system is further configured for comparing the output of the sensor with a second predetermined value below the first predetermined value for refocusing the multiple mirrors on the energy conversion device once the second predetermined value is reached.

In a more specific aspect, the multiple mirrors are flexible membrane mirrors, and the system includes a blower for causing the flexible membrane mirrors to focus incident sunlight on the energy conversion device when the blower is in operation, typically, by pulling as light vacuum on the membrane mirrors.

In a yet still more specific aspect, the energy conversion device is a Stirling engine, the sensor is a temperature sensor, and the blower makes up the arrangement for focusing and defocusing, including a blower controller for causing the blower to turn on and off in response to signals from the controller system generated in response to the output received from the temperature sensor.

In an alternative arrangement, the multiple mirrors are fixed focus mirrors mounted on the solar concentrator, in which they can be moved to a position in which reflected solar energy is not focused on the energy conversion device. The arrangement for focusing and defocusing may include moving means, for example, individual motors associated with each of the individual mirrors which are mounted for moving or pivoting, for moving at least one of the multiple mirrors between at least two positions, a first position in which the mirror focuses reflected solar radiation on the energy conversion device, and a second position in which the reflected solar radiation is directed away from the energy conversion device.

In both arrangements, as noted previously, such an energy conversion device can either be a Stirling engine, a photovoltaic device, or other type energy conversion device or system. For all types of energy conversion devices, while a temperature sensor has been indicated as one way of monitoring its condition, other arrangements, for example, such as monitoring the amount of electricity generated by a photovoltaic device as indicative of its operational condition can be employed in an alternative construction.

In an alternative, there is disclosed a method of controlling a solar concentrator system which includes a solar concentrator with at least one mirror for focusing reflected sunlight on an energy conversion device. The solar concentrator system includes an energy conversion device associated with the solar concentrator. The method includes providing a means for focusing and defocusing reflected sunlight from the at least one mirror on the energy conversion device. Such means can include a blower assembly in association with flexible membrane mirrors by which, depending on whether the blower assembly is turned on or off, the mirrors are either focused or defocused relative to incident sunlight reflected to the energy conversion device. The level of operation of the energy conversion device is monitored, with the energy conversion device having a predetermined maximum level of operation at which the operation of the energy conversion device is shut down. It is determined that the level of operation has reached a first predetermined level of operation below the maximum level, and if the first predetermined level of operation has been reached, the at least one mirror is defocused to reduce the intensity of reflected light directed onto the energy conversion device while maintaining the energy conversion device in operation. The level of operation of the energy conversion device is further monitored to determine if it reaches a second predetermined level lower than the first predetermined level, and when the second predetermined level is reached, the at least one mirror is refocused.

In a yet more specific aspect, the energy conversion device is a Stirling engine and the monitoring involves monitoring the temperature of the Stirling engine. Yet more specifically, the concentrator system includes a plurality of flexible membrane mirrors and a blower for focusing the mirrors when in operation, wherein the mirrors are focused and defocused by turning the blower on and off.

These and other features will become apparent to those of ordinary skill in the art from the following detailed description made with reference to the appended drawings.

DETAILED DESCRIPTION OF THE INVENTION

Figure 1:
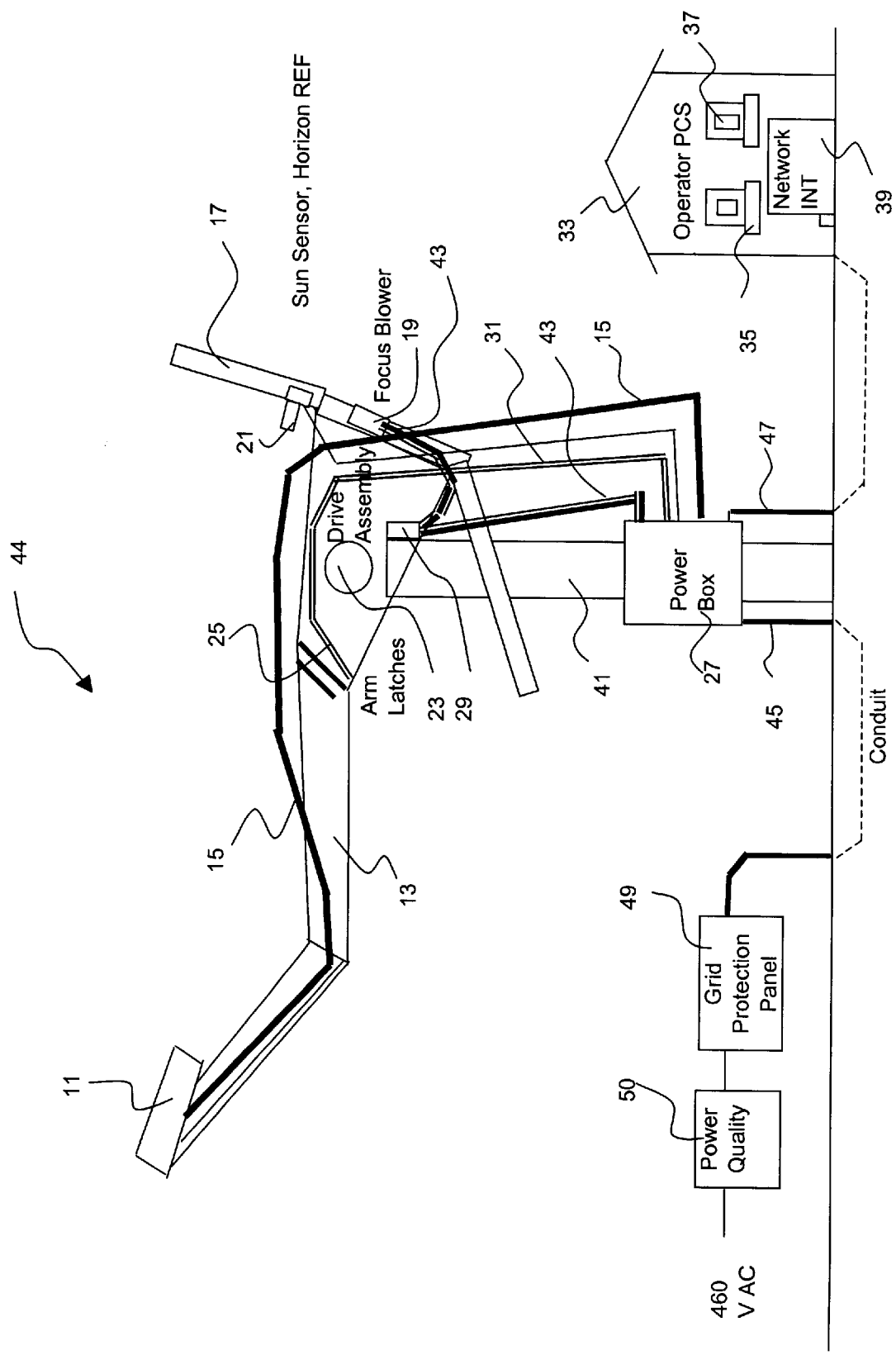
FIG. 1 is a block diagram of an exemplary solar collector system.

FIG. 1 is a block diagram of an exemplary solar collection system implementing the system and method described herein. A collection assembly 44 includes a solar collector dish 17 which is supported by a pedestal 41. The solar collector dish 17 has a focusing device 19 for focusing sunlight to the solar collector dish 17. The solar collector dish 17 is a system of solar collectors which focuses and collects solar energy. The focusing device 19 manipulates the solar collectors on the solar collector dish 17 to further fine tune the focusing of the collectors. The focusing device 19 may be a focus blower or oscillator or other equivalent device. More specifically, the focusing device 19 or concentrator may be made up of multiple flexible membrane mirrors. Focusing and defocusing of the mirrors may be accomplished by turning the blower on or off. In a typical arrangement such as in the aforementioned SunDish™ arrangements, the individual mirrors or facets thereof are focused by pulling a slight vacuum between membranes using a blower system.

Alternatively, instead of using flexible membrane mirrors, an arrangement, for example, of multiple pivotable fixed focus mirrors may be employed wherein the defocusing is accomplished by pivoting individual mirrors away from an optional focus position. In all cases, heat from the solar energy is converted to a usable form by an energy conversion device 11, for example, a Stirling engine system or photovoltaic device, which is supported by a support arm 13, and attached to the power box 27 by a cable 15. The power box is described in more detail in the discussion making reference to FIG. 2.

Figure 4:
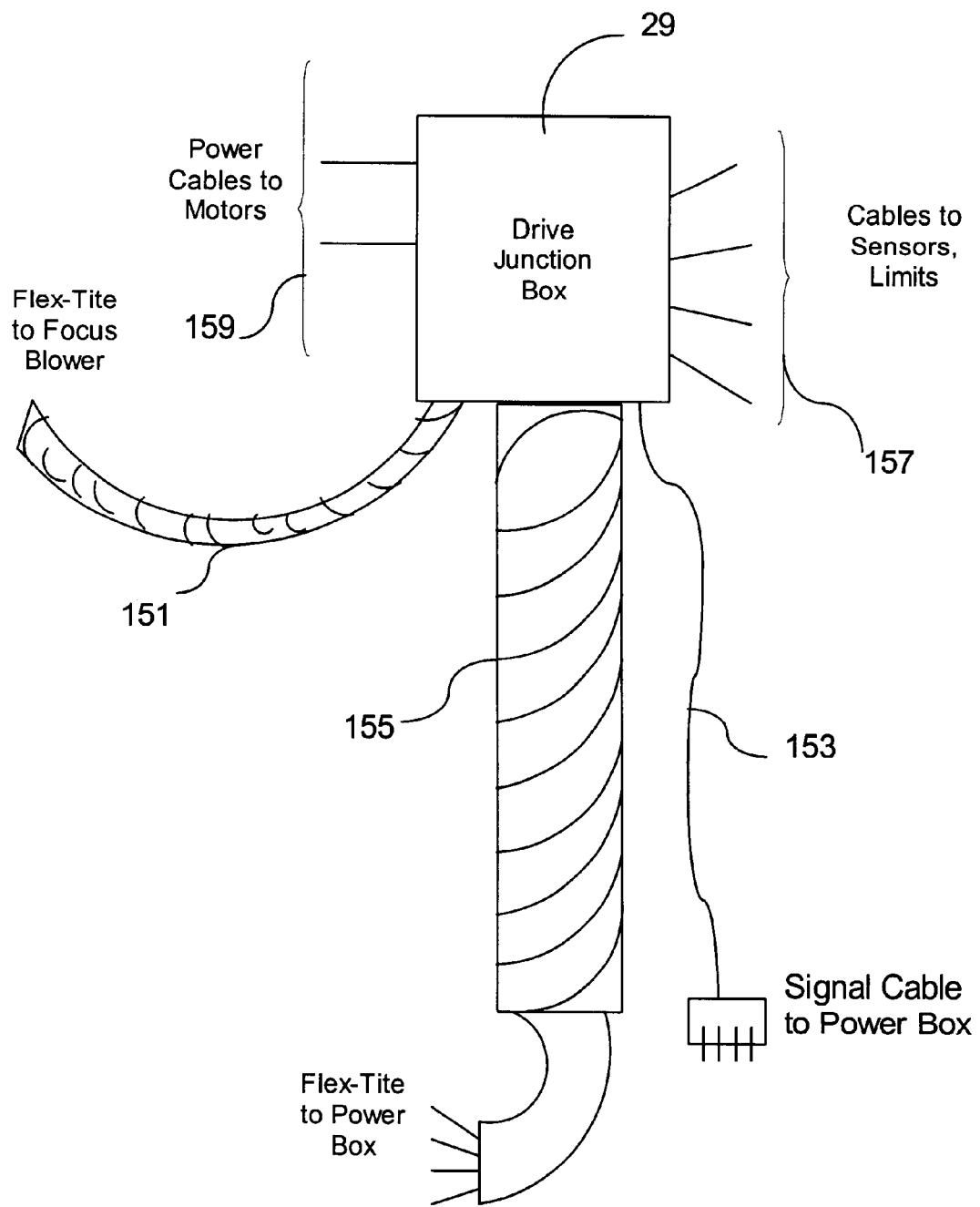
FIG. 4 is a block diagram of the drive assembly cabling for the system.

A drive assembly 23 and arm latches 25 control motion and orientation of the dish 17 and Stirling engine 11 with respect to elevation and azimuth. As discussed previously, a Stirling engine is an energy conversion device which is a type of Power Conversion System ("PCS"). A drive junction box 29, described in more detail in the discussion accompanying FIG. 4, is connected to the focusing device 19 and the power box 27 by cables 43. Sensors are placed at various locations on and around the solar collector dish 17, i.e., in association with the collector dish 17. Examples of such sensors are a sun sensor and horizontal reference sensor 21, which are shown in FIG. 1. Various other sensors may be placed on and around the dish 17, and are connected by cables 31 to the power box 27. Energy in the form of usable electricity is transferred from the power box 27 by a cable 45 through a grid protection panel 49 and through a power quality control box 50 eventually for use by energy consumers.

The power box 27 is also connected to a computer system at a user's station 33 by a cable 47. The computer system at the user's station 33 may include an operator terminal 35 for entering commands and a Power Conversion System ("PCS") processor terminal 37, such as a Stirling Power Conversion System, connected by a network 39 for communication with the collection assembly 44. The computer system 35, 27, and 39 communicates and controls the orientation of the solar collector assembly 44.

Figure 2:
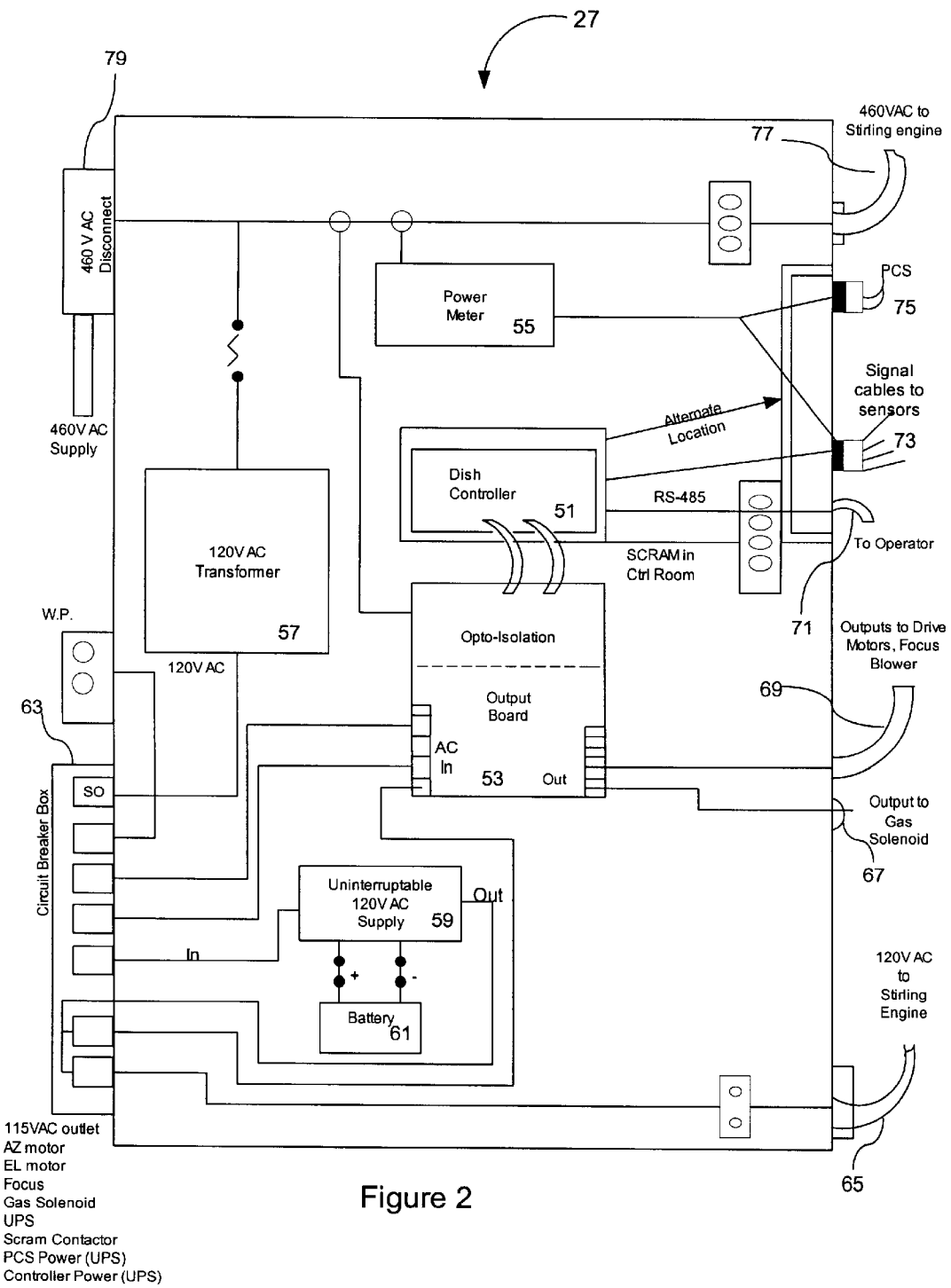
FIG. 2 is a block diagram of a power box used with the system.

FIG. 2 is a block diagram showing in greater detail the power box 27. The power box 27 is connected to the energy conversion device 11, in this case exemplified by a Stirling engine, by connections 77 and 65, to the sensors (21 in FIG. 1) by connections 75, to the PCS terminal (37 in FIG. 1) by connections 75, to the operator terminal (35 in FIG. 1) by connections 71, to drive motors and the focusing device (19 in FIG. 1) by connections 69, and to a gas solenoid by connection 67. The gas solenoid (not shown) opens a valve to provide fuel gas to the system for gas-fired hybrid power production, if desired. Otherwise, electricity powers operation of the system directly. The power box 27 has a connection from the energy conversion device, i.e., engine 11 to an output 79. The power box 27 monitors the engine 11 and associated sensors with a power meter 55. The power box 27 also contains a dish controller 51 and output board 53, which are described in more detail in the discussion accompanying FIG. 3.

The power box 27 has an uninterruptible power supply 59 connected to a battery 61 for supplying power to the entire assembly (44 in FIG. 1). Therefore, the control system can continue to operate even if it is not receiving solar power. The power box 27 contains a circuit breaker box 63 to protect the electronics from power surges. The power box 27 may also include a transformer 57.

In one embodiment, the power box 27 includes a manual 460 volt alternating current ("VAC") disconnect 79 from the utility grid 49 (FIG. 1), a 460VAC to 115VAC transformer 57, a 115VAC uninterruptible power supply 59 for the Stirling engine controls and for the dish controller 51, a 24 volt direct current ("VDC")control power supply, a battery 61 for powering the uninterruptible power supply, a device for monitoring the power output of the system as an input to a controller, relays for dish control outputs, the dish controller component 51. In another embodiment the power box 27 includes an inverter device for inverting direct current electrical power to alternating current.

Figure 3:
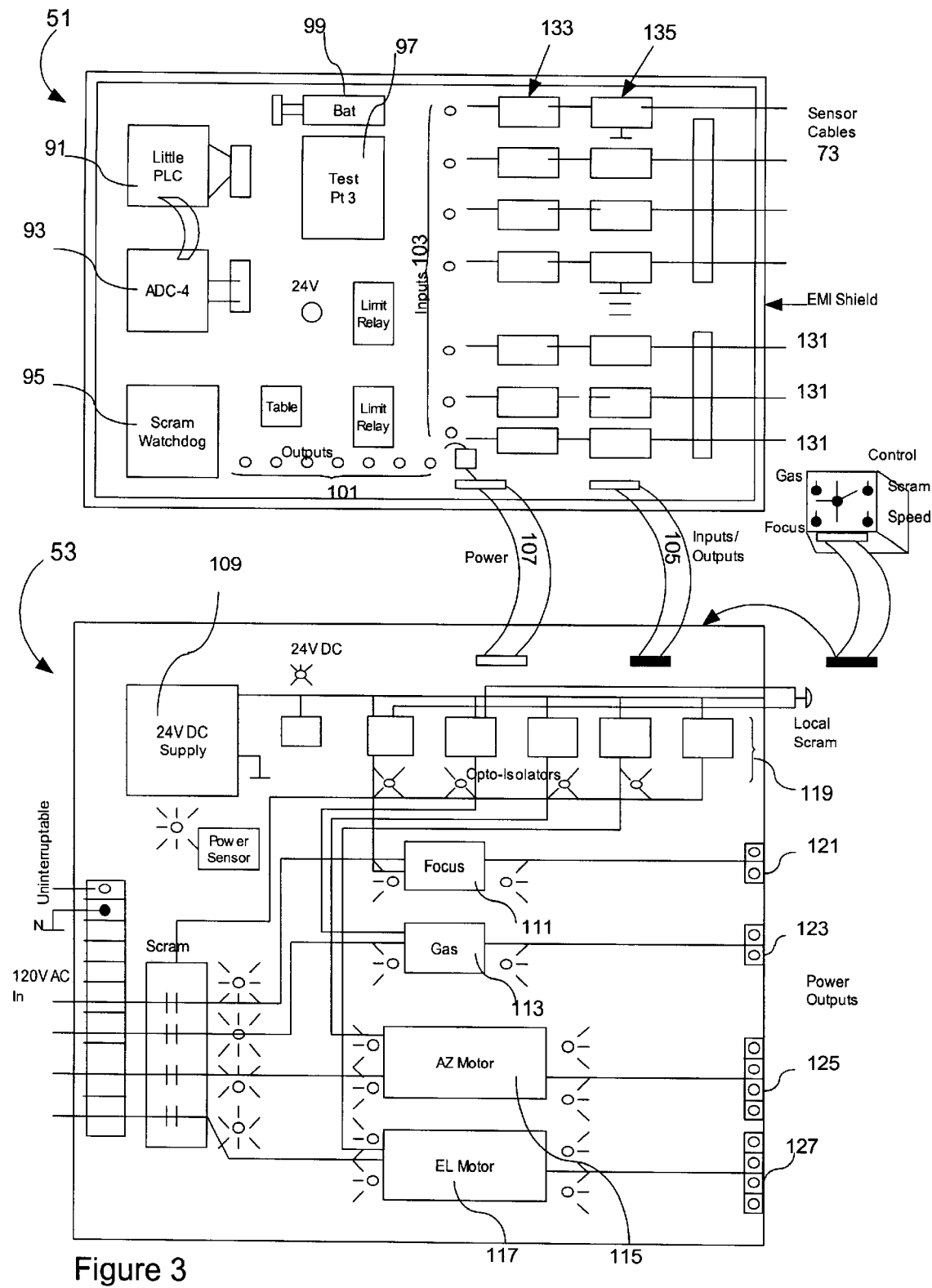
FIG. 3 is a block diagram of the dish controller and output board of the system.

FIG. 3 is a block diagram of the dish controller 57 and output board 53. The dish controller 57 has sensor cable inputs 73 and communication lines 131, which connect to the Stirling engine 11, the operator terminal 35, and manual controls. The dish controller 57 may be powered by a battery 99, which may serve as a backup power supply. The sensor cable inputs 73 and communication lines 131 include buffers/opto-isolation chips 133, of the type well-known to those of ordinary skill, and varistors 135 for protecting the electronics from power surges and lightning strikes.

The cables 73 and 131 are connected to light emitting diodes (LEDs) inputs 103. Test points 97 provides a point where a technician may test the electronics. The dish controller 57 includes a programmable logic controller ("PLC") 91 connected to an analog to digital converter ("ADC") 93. A "SCRAM switch" 95, of the type well known to those of ordinary skill, is provided as an emergency shut-off switch.

The inputs 103 and outputs 101 of the dish controller 57 have status lights (off=0, on=1) to display the respective states, i.e., on or off, and are connected by a connection 105 to the output board 53. The inputs and outputs can be easily read by a service technician. The dish controller also receives power from a power supply 109 in the output board 53 through a power cable 107. Opto-isolators 119 provide power surge protection. The outputs 101 from the dish controller 57 control the orientation of the solar collector through a controller for the focusing device 111, a first controller 113 for the gas solenoid, a second controller 115 for the azimuth motor, and a third controller 117 for the elevation motor. Controllers 111, 113, 115, and 117 are connected to power outputs 112, 123, 125, and 127 for powering the focusing device, gas solenoid, azimuth and elevation motors (not shown in detail).

In one embodiment, the dish controller 51 is a board that uses signal-level voltages (24VDC or less) and performs input and output signal processing and computed control functions. It may be mounted in a box within the power box 27 or in a separate enclosure in communication with the power box 27.

FIG. 4 is a block diagram illustrating the drive assembly cabling. A drive junction box 29 connects cables to the sensors 157 and cables to the various motors in the system 159. A connection 151 is also provided to the focusing device 19, as are connections 155 to the power box 27, and a signal cable connection 153 to the power box 27.

The control software is run from the PLC 91 shown in FIG. 3 as part of the dish controller 57. The program implementing the algorithms receives inputs from one or more sensors in and around the solar collector; determines the state of the solar collector from the inputs; receives a command from an external source for controlling operation of the solar collector; and executes instructions to complete the command based on the state of the solar collector. The program implements a truth table to map a set of instructions to each unique set of conditions. Certain conditions may also trigger a "system override," which shuts the system down. The commands may originate from the user at the operator terminal 35 or the commands may be generated by a detected set of conditions. An example of a truth table is shown in Table 1 in the Program Routine Example, which follows hereafter.

Figure 5:
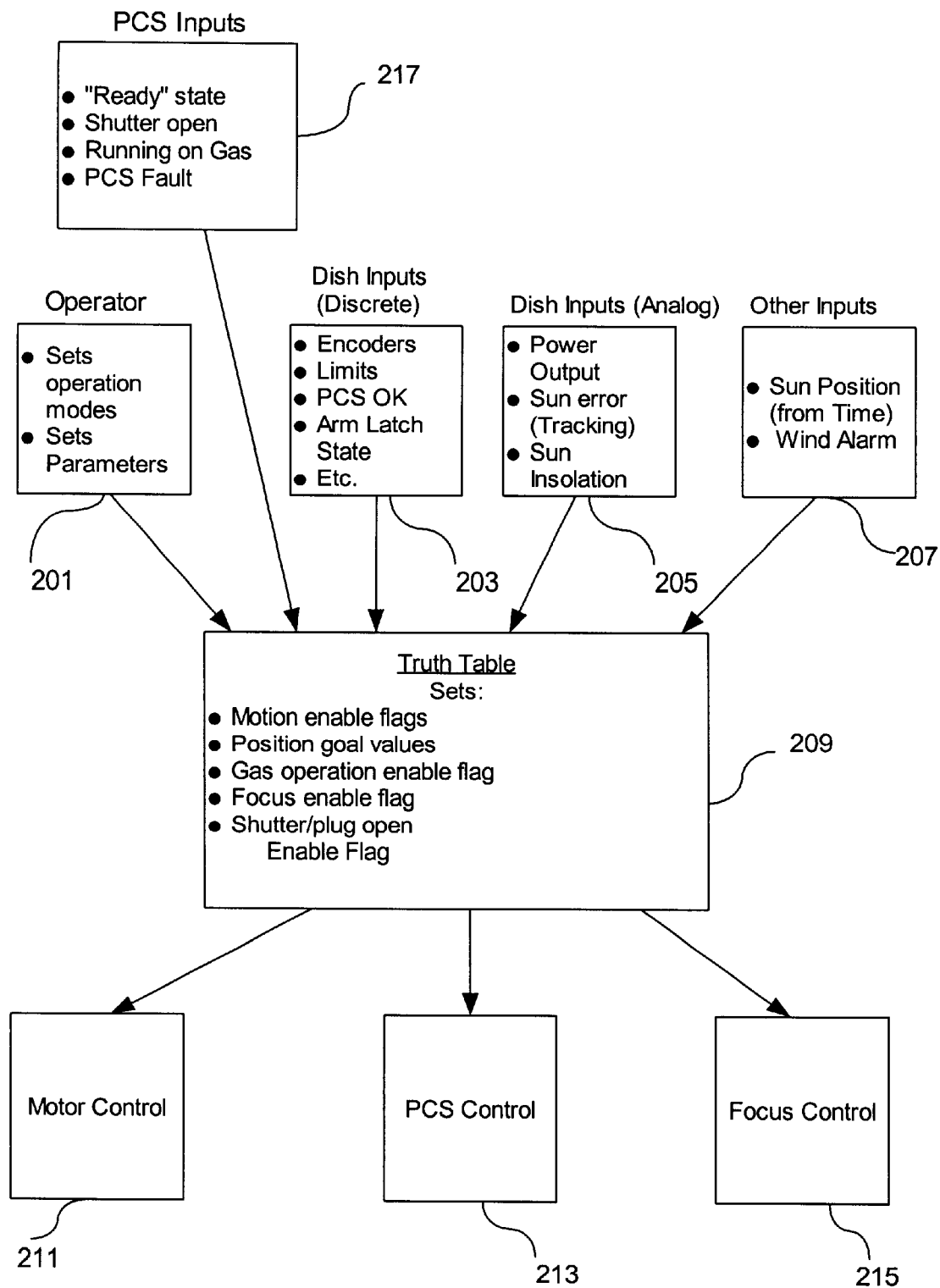
FIG. 5 is a diagram of the truth table operation which illustrates operation of the system.

FIG. 5 is a diagram of an example of a truth table operation. Inputs are received from four categories of information. At block 201, inputs are received from the operator terminal 35 to set operation modes and set the parameters of operation. At block 203, inputs are received from digital dish inputs regarding information about encoders, limits, the PCS, the arm latch state, etc. At block 205, analog dish inputs are received regarding information such as power output, sun error (tracking), and sun insolation. At block 207, other inputs such as sun position and wind alarm are received.

Block 209 represents the truth table. The truth table sets flags corresponding to a unique set of instructions. Examples of flags include the motion enable flags, the position goal values, the gas operation enable flag, the focus enable flag, and the shutter/plug open enable flag. The flags are set based on the states received from blocks 201, 203, 205, 207 and 217. The flags and the position goal values correspond to a unique set of instructions which are transferred from the truth table 209 to motor controls 211, PCS controls 213, and focus controls 215.

In this specific instance, block 217 provides inputs from, in this case a controller for the Stirling engine 11, and indicates whether the energy conversion device is in: (1) a ready state; (2) whether the shutter is open; (3) whether it is running on gas; or (4) whether there is a fault, for example, an overheating condition where it has shut down due to temperature of operation exceeding a maximum value such as might occur when too much light is focused on the energy conversion device. This information can be in the form of temperature sensed by a temperature sensor from which a controller at the energy conversion device effectuates a shutdown and transmits a PCS fault signal to the dish controller 51 and its truth table 209.

The truth table may be implemented in a variety of environments, including commercially available computer systems, programmable gate arrays, and microprocessor chips.

PROGRAM ROUTINE AND ENVIRONMENT EXAMPLE

The following example of the routine and the environment in which the program routine is run is provided to illustrate an embodiment of the invention.

The software preferably operates in the real-time Dynamic C programming environment on a Z-World Little PLC microcontroller. Such a controller uses a Z180 processor, and has 128 K Bytes of battery-backed static random access memory (RAM) in which the program and data reside. The controller has eight digital inputs, and eight outputs capable of directly driving relays. An expansion board (e.g., Z-World ADC-4) provides an additional four conditioned and seven unconditioned analog inputs with a 12-bit A-to-D converter. The Little PLC also includes a real-time clock and two RS-485 simplex (two-wire) serial communications ports. One of these ports are used to communicate with a central supervisory control and data acquisition (SCADA) system, shown in FIG. 1, as user terminal 35 and network 39, and the other port is used to communicate with the Stirling Power Conversion System (PCS) processor shown as PCS terminal 37 in FIG. 1.

The control software operates a solar collector system 44 as shown in FIG. 1 in a stand-alone manner, including solar operation and operation on fuel, such as gas, direct electrical power from an electrical distribution system or and/or other alternative energy source. The system communicates with the external supervisory control and data acquisition, (SCADA), system that operates over a daisy-chain network to provide user input and display of system parameters, data downloads, and overall system control multiple solar collector systems 44. The SCADA system also incorporates a wind sensor (not shown), and tells the solar collector systems 44 on the network when the wind exceeds allowable limits.

Solar operation is controlled with both calculated and sensor inputs. A sun position algorithm calculates the expected position of the sun. A sun sensor provides information about the relative position of the dish to the sun, as well as measuring the total solar insolation. The insolation sensor allows decisions to be made regarding whether to use the sun sensor directions and whether net power can be generated. Finally, a tracking optimization algorithm allows the system to track the aim point at which peak power is generated.

Operation on gas is allowed independent of solar operation. When solar operation is disabled or the sun is insufficient for net power generation on solar, a shutter/plug is kept closed in front of the receiver to maximize efficiency for fuel operation.

The overall architecture of the control program is that of a set of real-time interrupt-driven background tasks and a set of foreground tasks that operate in an endless loop. The real-time tasks are devoted to measurement and control of the high-frequency components of the control system. These consist of encoder signals from the system drive motors, used to calculate the dish position in real time, and the control of the drive motors. The foreground loop consists of several parallel tasks that cooperatively multi-task to perform all of the other control actions needed by the system.

The controlling element in the system is the truth-table function, which implements the program algorithm. This function takes as its inputs the values of a set of system flags that uniquely determine the status and operating mode of the system. The flags consist of overrides, system control flags, and system status flags. The outputs from the function include a function to enable flags for motion, focus, and running on gas, and goal values for the azimuth and elevation of the dish. The outputs are processed by other functions to control movement and operation of the system.

In addition, there are three system override flags. They override any other system operations. The override flags are as follows:

local The system is under local control at the pedestal. This is triggered when the power output cable containing the motor and focus power lines is disconnected from the controller. It leads to disabling of movement and focus outputs, but allows operation to resume when the cable is re-attached.

high_wind This flag is set when the SCADA system measures winds exceeding the stow threshold, and commands the system to stow. It leads to shutdown of solar operation and stowing of the dish in a face-up position feathered 90 degrees to the wind, or a face-down position, whichever is closer. After the high wind subsides, the system is allowed to return to solar operation. The system may continue to be powered with fuel during a high-wind stow.

fault This is triggered whenever a fault occurs in the system. It leads to shutdown of solar and fuel operation, and stowing of the dish until the fault is reset from the SCADA system. The fault flag is bit-mapped, with the following bit values:
1 Failure of the latch on the support arm to unlatch when going to stow
2 Azimuth motor fault—either the motor did not move when commanded, or it moved when not commanded
3 Elevation motor fault—same as Azimuth motor fault
4 PCS fault—loss of "PCS Ready" indication (either the physical switch closure or the serial status)
5 focus power fault—power was detected to the focusing device when it was commanded to be off
6 plug fault—the plug failed to open when the dish was focused
7 PCS communications fault—the PCS failed to respond to status requests There are three main system control flags, and two auxiliary control flags that only have an effect when the system is in local control. The three main control flags are set via the supervisory control and data acquisition, (SCADA), system; the auxiliary flags are set in response to physical switch closures in the local control pendant. The flags are as follows:

run$_{13}$ solar This flag enables solar operation. When enabled, the system automatically wakes itself, generates power when the solar insolation is high enough, and stows itself at night or if high winds occur.

run_gas This flag enables operation on fuel. When enabled, the Stirling Power Conversion System (PCS) is told to run on gas. Unless solar operation is enabled and the system is focused, the aperture plug is kept closed.

track_mode This flag determines the mode in which the system will track the sun when solar operation is enabled. The four modes are as follows:
0 sun sensor—the sun sensor directions are used to direct the dish. If the insolation is insufficient, the system reverts to the calculated sun position for tracking.
1 calculated sun position—the calculated position of the sun is used for tracking
2 optimized tracking—previously determined offsets (as a function of the azimuth and elevation position of the dish) from the sun position are used for tracking. These offsets position the dish to produce maximum net power.
3 tracking calibration—system tracking is adjusted to produce maximum net power output, and the offsets from the sun position are stored for later use in tracking mode 2.

local_open_plug This flag is set in response to a switch closure on the local control pendant calling for the plug to be opened local_run_gas This flag is set in response to a switch closure on the local control pendant calling for the PCS to run on fuel.

System Commands

System commands are used to enable and control the system functions of the dish. All system commands used herein begin with the letter "S". The commands and their mneumonics are as follows:

SW n High "W"ind—the wind has exceeded the maximum operational setpoint, and is coming from direction "n" (0–15, for 0 to 360 degrees azimuth). This command may be entered manually, but is also sent automatically from the network controller to each dish on the network if high winds are detected.

SL "L"ow wind—the wind has dropped below the high-wind setpoint. This command may be entered manually, but is also sent automatically from the network controller to each dish on the network when high winds cease.

SR Enable solar operation (i.e., "R"un on solar)
SD "D"isable solar operation
SG Enable "G"as (fuel) operation
SN Disable gas (fuel) operation (i.e., "N"o gas)
ST "T"rack using the calculated sun position
SS Track using the "S"un sensor SO Track using "O"ptimized tracking offsets SC Perform tracking "C"alibration to maximize power output SA n Adjust the "A"zimuth position of the dish by approximately "n" hundredths of a degree (used for debugging)

SE n Adjust the "E"levation position of the dish by approximately "n" hundredths of a degree (used for debugging)

SX Adjust the dish position to be on-sun (i.e, "X" marks the spot?)

Parameter Setting Commands

An operator may enter parameter commands to the operator terminal 35 as shown in FIG. 1. Operation of a Solar collector system involves many parameters that will vary from system to system. Parameter commands allow any of the parameter values to be examined or updated. Examples of parameters include the following:

Azimuth stow position (degrees from true North)

Elevation stow position (degrees above/below horizon)

Wind stow position (degrees above horizon)

Latitude of the system (degrees)

Longitude of the system (degrees)

Number of hours between local time and Greenwich Mean Time

Data Commands

Data commands allow the user access to the performance and other data stored by the control program during its operation. A system log is available that details the last several seconds of truth-table operation, giving inputs and outputs from the truth-table. This is mainly useful for debugging of system operation. The performance data log contains information about system operation and energy production. Both the frequency of sampling and the number of data samples that are averaged together for each recorded data point may be set by the user. An instantaneous status command gives the present conditions and mode of operation for the dish. Finally, the offset table from tracking calibration can be downloaded for examination and possible off-line processing Inputs and Outputs System Inputs The Little PLC has eight opto-isolated digital inputs, and the addition of the ADC-4 board adds four conditioned and seven unconditioned analog inputs. These are connected as follows:

Little PLC Inputs:

0 Azimuth encoder channel 1

1 Azimuth encoder channel 2 (quadrature, giving direction, East or West)

2 Elevation encoder channel 1

3 Elevation encoder channel 2 (quadrature, giving direction, Up or Down)

4 local/auto—this contact is closed by shorting pins on the plug of the cable that provides AC power to the drive motors, focusing device, and PCS. It indicates local operation of the system when that cable is unplugged from the control board.

5 zimuth limit switch 6 levation limit switch

7 PCS arm unlatch switch—tells the controller if the PCS arm unlatched successfully when driving to stow ADC-4 Analog Inputs:

0 Azimuth error from sun sensor

1 Elevation error from sun sensor

2 Solar insolation reference sensor

3 System power output

4 Ambient temperature sensor

5 Relative humidity sensor

6 PCS_ready switch closure from PCS (used as a digital input)

7 Below_horizon switch closure from tilt switch (used as a digital input)

8 Focus_power sensing—detects power to focusing device (used as a digital input)

9 Local_open_plug—switch closure on local pendant to request manual opening of plug (used as digital input)

10 Local_run_gas—switch closure on local pendant to request manual operation on fuel (used as a digital input)

System Outputs

The eight outputs of the Little PLC are used to control the direction and operation of the drive motors and to actuate the focusing device. The outputs are as follows:

1 Azimuth motor run

2 Azimuth direction (energize to go East; default is West)

3 not used

4 Elevation motor run

5 Elevation direction (energize to go Up; default is Down)

6 not used

7 Focusing device on (to focus dish)

8 Gas valve open (for running on gas)

PROCESSING INPUTS AND OUTPUTS

If the system is being started for the first time, a program routine initializes the data and system logs, and initializes some variables that will keep the system from taking off when it starts. The dish is told it is at a stow position, so that until it is initialized it will not move.

The next program routine initializes other variables and parameters so that their states are not undetermined when the program begins its loop. Variables and status flags are set to nominal values.

Finally, the system enters an infinite loop in which all of the foreground functions are accomplished. A "costate" construct is a function that allows cooperative multi-tasking between functions in the loop. Each time through the loop, each costate is processed in turn. If a "waitfor( )" function is encountered in a costate, the processor skips that costate from then on until the allotted time has passed. This allows the costates to allow other functions to operate.

One costate processes communications with the SCADA system. The SCADA system communicates with the solar collectors in the network using a protocol that provides error checking and addressing of commands to specific controllers within the network.

A second costate contains the truth-table function evaluation. Before evaluation of the truth table, the input states are stored in the system log. Immediately after the truth table evaluation, the output results are stored in another log. The log data is stored in a circular buffer format, so that the latest data always overwrites the oldest data in the array. Other functions are allowed to operate between execution of the truth table function.

The following table summarizes other costates in the system.

focus Controls focusing of the dish. Sets the "focused" flag.

PCS Controls interaction with the PCS. This includes prompting the PCS for status and sending requests for actions such as opening and closing the aperture plug.

orientation Updates the dish orientation using the motor counts that are updated by a background function.

get_inputs Updates the input values and related variables and flags sun_az_el Calculates the sun position at the present time The final costate in the program routine performs performance data averaging and tracking calibration, if that mode is enabled. System output power and insolation values are sampled every "sample_period" seconds (preferably a default 5 seconds), and summed over a number of samples set by the user (preferably a default 60 samples, resulting in 5-minute averages) to obtain averages, and a program routine to load data is called to place the averaged values into the system performance data file.

The processing of the various inputs resulting in the outputs described herein is controlled by a truth table. An example of a truth table is shown, as noted previously, by the following Table 1. The input values are described at the top of the truth table. Each row of values corresponds to a unique state, which in turn corresponds to a unique set of instructions to be issued to the solar collector system 44. The "allowed dish control states" indicate when a state is required for a given command. If a command is issued and the required state is not the state indicated by the table, the software program detects the error and issues a default set of commands.

| | | | | COMMAND MODES | | | |
|---|---|---|---|---|---|---|---|
| 485 SWITCH SCADA MASTER ON = 1 OFF = 0 PLACE 64 | 485 DIGITAL SCADA RUN ENGINE ON FUEL RUN = 1 DON'T RUN = 0 PLACE 32 | INTERNAL DIGITAL CLOCK 6AM–6PM = 1 6PM–6AM = 0 PLACE 16 | 485 DIGITAL WIND SPEED NONE = 1 TO MUCH = 0 PLACE 8 | DIGITAL DIGITAL HORIZON INDICATOR ABOVE = 1 BELOW = 0 PLACE 4 | ANALOG DIGITAL &ED DIGITAL SUN TRACK ALLOWED >400W/M$^2$ = 1 <400W/M$^2$ = 0 PLACE 2 | 485 DIGITAL DEAD REACON OR SUN TRACK SUN TR = 1 DR/SUN = 0 DR/SUN = 0 | 485 DIGITAL SCADA PEAK POWER TRACK PKPWR = 1 DR/SUN = 0 PLACE 1 |
| 0 | 0 | 0-1 | 0-1 | 1 | 0-1 | | 0-1 |
| 0 | 0 | 0-1 | 0-1 | 1 | 0-1 | | 0-1 |
| 0 | 0 | 0-1 | 0-1 | 1 | 0-1 | | 0-1 |
| 0 | 0 | 0-1 | 0-1 | 1 | 0-1 | | 0-1 |
| 0 | 0 | 0-1 | 0-1 | 0 | 0-1 | | 0-1 |
| 0 | 0 | 0-1 | 0-1 | 0 | 0-1 | | 0-1 |
| 0 | 0 | 0-1 | 0-1 | 0 | 0-1 | | 0-1 |
| 0 | 1 | 0-1 | 0-1 | 1 | 0-1 | | 0-1 |
| 0 | 1 | 0-1 | 0-1 | 1 | 0-1 | | 0-1 |
| 0 | 1 | 0-1 | 0-1 | 0 | 0-1 | | 0-1 |
| 0 | 1 | 0-1 | 0-1 | 0 | 0-1 | | 0-1 |
| 0 | 1 | 0-1 | 0-1 | 0 | 0-1 | | 0-1 |
| 0 | 1 | 0-1 | 0-1 | 0-1 | 0-1 | | 0-1 |
| 1 | 0 | 0 | 0 | 0-1 | 0-1 | | 0-1 |
| 1 | 0 | 0 | 1 | 0-1 | 0-1 | | 0-1 |
| 1 | 0 | 1 | 0 | 0-1 | 0-1 | | 0-1 |
| 1 | 0 | 1 | 0 | 0-1 | 0-1 | | 0-1 |
| 1 | 0 | 1 | 0 | 0-1 | 0-1 | | 0-1 |
| 1 | 0 | 1 | 0 | 0-1 | 0-1 | | 0-1 |
| 1 | 0 | 1 | 0 | 0-1 | 0-1 | | 0-1 |
| 1 | 0 | 1 | 0 | 0-1 | 0-1 | | 0-1 |
| 1 | 0 | 1 | 0 | 0-1 | 0-1 | | 0-1 |
| 1 | 0 | 1 | 0 | 0-1 | 0-1 | | 0-1 |
| 1 | 0 | 1 | 1 | 0 | 0-1 | | 0-1 |
| 1 | 0 | 1 | 1 | 0 | 0-1 | | 0-1 |
| 1 | 0 | 1 | 1 | 0 | 0-1 | | 0-1 |
| 1 | 0 | 1 | 1 | 1 | 0 | | 0-1 |
| 1 | 0 | 1 | 1 | 1 | 0 | | 0-1 |
| 1 | 0 | 1 | 1 | 1 | 1 | | 0 |
| 1 | 0 | 1 | 1 | 1 | 1 | | 0 |
| 1 | 0 | 1 | 1 | 1 | 1 | | 0 |
| 1 | 0 | 1 | 1 | 1 | 1 | | 0 |
| 1 | 0 | 1 | 1 | 1 | 1 | | 1 |
| 1 | 0 | 1 | 1 | 1 | 1 | | 1 |
| 1 | 0 | 1 | 1 | 1 | 1 | | 1 |
| 1 | 1 | 0 | 0-1 | 0-1 | 0-1 | | 0-1 |
| 1 | 1 | 0 | 0-1 | 0-1 | 0-1 | | 0-1 |
| 1 | 1 | 1 | 0 | 0-1 | 0-1 | | 0-1 |
| 1 | 1 | 1 | 1 | 0 | 0-1 | | 0-1 |

-continued

| | | | | | | |
|---|---|---|---|---|---|---|
| 1 | 1 | 1 | 1 | 1 | 0 | 0-1 |
| 1 | 1 | 1 | 1 | 1 | 0 | 0-1 |
| 1 | 1 | 1 | 1 | 1 | 1 | 0-1 |
| 1 | 1 | 1 | 1 | 1 | 1 | 0-1 |

ALLOWED DISH CONTROL STATES

| STATE NUMBERS | | SLEEP STOW | HIGH WIND STOW | SHUT DOWN | WAKE UP | DEAD REACON | SUN TRACK | PEAK POWER TRACK | SUN WALK OFF FAILURE | RUN ENGINE SOLAR | RUN ENGINE FUEL |
|---|---|---|---|---|---|---|---|---|---|---|---|
| 1 TO 31 | = | | | 1 | | | | | | | |
| 1 TO 31 | = | | | 1 | | | | | | | |
| 1 TO 31 | = | | | 1 | | | | | | | |
| 1 TO 31 | = | | | 1 | | | | | | | |
| 1 TO 31 | = | | | 1 | | | | | | | |
| 1 TO 31 | = | | | 1 | | | | | | | |
| 1 TO 31 | = | 1 | | | | | | | | | |
| 32 TO 63 | = | | | 1 | | | | | | | |
| 32 TO 63 | = | | | 1 | | | | | | | |
| 32 TO 63 | = | | | 1 | | | | | | | |
| 32 TO 63 | = | | | 1 | | | | | | | |
| 32 TO 63 | = | 1 | | | | | | | | | 1 |
| 32 TO 63 | 1 TO 31 | 1 | | | | | | | | | 1 |
| 64 TO 71 | = | 1 | | | | | | | | | |
| 72 TO 79 | = | 1 | | 1 | | | | | | | |
| 80 TO 87 | = | | 1 | | | | | | | | 0 |
| 80 TO 87 | = | | 1 | | | | | | | | 0 |
| 80 TO 87 | = | | 1 | | | | | | | | 0 |
| 80 TO 87 | = | | 1 | | | | | | | | 0 |
| 80 TO 87 | = | | 1 | | | | | | | | 0 |
| 80 TO 87 | = | | 1 | | | | | | | | 0 |
| 80 TO 87 | = | | 1 | | | | | | | | 0 |
| 80 TO 87 | = | 1 | | | | | | | | | 0 |
| 88 TO 91 | = | | | | 1 | | | | | | 0 |
| 88 TO 91 | = | | | | 1 | | | | | | 0 |
| 88 TO 91 | = | | | | 1 | | | | | | 0 |
| 92 TO 93 | = | | | | | 1 | | | | | |
| 92 TO 93 | = | | | | | 1 | | | | | |
| 94 | = | | | | | | 1 | | | | |
| 94 | = | | | | | | 1 | | | | |
| 94 | = | | | | | | 1 | | | | |
| 94 | = | | | | | | 1 | | | | |
| 95 | = | | | | | | | 1 | | | |
| 95 | = | | | | | | | 1 | | | |
| 95 | = | | | | | | | 1 | | | |
| 95 | = | | | | | | | 1 | | | |
| 96 TO 111 | = | 1 | | | | | | | | | 1 |
| 96 TO 111 | = | 1 | | | | | | | | | 1 |
| 112 TO 119 | = | 1 | | | | | | | | | 1 |
| 120 TO 123 | = | 1 | | | | | | | | | 1 |
| 124 TO 125 | = | | | | | 1 | | | | | 1 |
| 124 TO 125 | = | | | | | 1 | | | | | 1 |
| 126 TO 127 | = | | | | | | | 1 | | | 1 |
| 126 TO 127 | = | | | | | | | 1 | | | 1 |

| STATE NUMBERS | | DIGITAL DIGITAL ARM LOCK LOCK = 1 UNLOCK = 0 | 485 DIGITAL RECEIVER APERTURE OPEN = 1 CLOSED = 0 | 485 DIGITAL ENGINE READY ON = 1 OFF = 0 | DIGITAL DIGITAL AZIMUTH STOW POSITION EAST = 1 NOT EAST = 0 | DIGITAL DIGITAL ELEVATION STOW POSITION FACE DOWN = 1 NOT F.D = 0 | DIGITAL DIGITAL ELEVATION WIND STOW POSITION FACE UP = 1 NOT F.U. = 0 | DIGITAL WIND DIRECTION ALIGNED = 1 NOT ALLIG. = 0 |
|---|---|---|---|---|---|---|---|---|
| 1 TO 31 | = | 1 | 1 | 1 | 0 | 0 | | |
| 1 TO 31 | = | 1 | 1 | 1 | 0 | 0 | | |
| 1 TO 31 | = | 1 | 0 | 1 | 1 | 0 | | |
| 1 TO 31 | = | 1 | 0 | 1 | 1 | 0 | | |
| 1 TO 31 | = | 1 | 0 | 1 | 1 | 0 | | |
| 1 TO 31 | = | 0 | 0 | 1 | 1 | 0 | | |
| 1 TO 31 | = | 0 | 0 | 1 | 1 | 1 | | |
| 32 TO 63 | = | 1 | 0 | 1 | 0 | 0 | | |
| 32 TO 63 | = | 1 | 0 | 1 | 1 | 0 | | |
| 32 TO 63 | = | 1 | 0 | 1 | 1 | 0 | | |

-continued

| | | | | | | | | |
|---|---|---|---|---|---|---|---|---|
| 32 TO 63 | = | 0 | 0 | 1 | 1 | 0 | | |
| 32 TO 63 | = | 0 | 0 | 1 | 1 | 1 | | |
| 32 TO 63 | 1 TO 31 | 0 | 0 | 0 | 1 | 1 | | |
| 64 TO 71 | = | 0 | 0 | 1 | 1 | 1 | | |
| 72 TO 79 | = | | 0 | | | | | |
| 80 TO 87 | = | 1 | 0 | 1 | 0 | 0 | 0 | 0 |
| 80 TO 87 | = | 1 | 0 | 1 | 0 | 0 | 1 | 0 |
| 80 TO 87 | = | 1 | 0 | 1 | 0 | 0 | 1 | 0 |
| 80 TO 87 | = | 1 | 0 | 1 | 0 | 0 | 1 | 1 |
| 80 TO 87 | = | 1 | 0 | 1 | 0 | 1 | 0 | 1 |
| 80 TO 87 | = | 0 | 0 | 1 | 0 | 1 | 0 | 0-1 |
| 80 TO 87 | = | 0 | 0 | 1 | 0 | 1 | 0 | 0-1 |
| 80 TO 87 | = | 0 | 0 | 1 | 1 | 1 | 0 | 0-1 |
| 88 TO 91 | = | 0 | 0 | 1 | 1 | 1 | 0 | 0 |
| 88 TO 91 | = | 0 | 0 | 1 | 1 | 1 | 0 | 0 |
| 88 TO 91 | = | 0 | 0 | 1 | 1 | 1 | 0 | 0 |
| 92 TO 93 | = | 1 | 1 | 1 | | | | |
| 92 TO 93 | = | 1 | 1 | 1 | | | | |
| 94 | = | 1 | 1 | 1 | | | | |
| 94 | = | 1 | 1 | 1 | | | | |
| 94 | = | 1 | 1 | 1 | | | | |
| 94 | = | 1 | 1 | 1 | | | | |
| 95 | = | 1 | 1 | 1 | | | | |
| 95 | = | 1 | 1 | 1 | | | | |
| 95 | = | 1 | 1 | 1 | | | | |
| 95 | = | 1 | 1 | 1 | | | | |
| 96 TO 111 | = | 0 | 0 | 1 | 1 | 1 | | |
| 96 TO 111 | = | 0 | 0 | 0 | 1 | 1 | | |
| 112 TO 119 | = | 0 | 0 | 1 | 1 | 1 | | |
| 120 TO 123 | = | 0 | 0 | 1 | 1 | 1 | | |
| 124 TO 125 | = | 1 | 0 | 1 | | | | |
| 124 TO 125 | = | 1 | 0 | 1 | | | | |
| 126 TO 127 | = | 1 | 0 | 1 | | | | |
| 126 TO 127 | = | 1 | 0 | 1 | | | | |

| | | | | STATE INPUTS FROM SENSORS AND ENCODERS | | | | |
|---|---|---|---|---|---|---|---|---|
| | | | | 485 | | | 485 | |
| STATE NUMBERS | | 485 DIGITAL DRIVE TO WIND ALIGN CCWT = 1 CWT = 0 | DIGITAL AZIMUTH DIRECTION TO STOW CCWT = 1 CWT = 0 | DIGITAL AZIMUTH MOTOR RUN VERIFY NOT VERIF. = 1 VERIFIED = 0 | DIGITAL ELEVATION MOTOR RUN VERIFY NOT VERIF. = 1 VERIFIED = 0 | 485 DIGITAL DEFOCUS BLOWER VERIFY OFF = 1 ON = 0 | DIGITAL AZIMUTH CALCULATE VS COUNTS DIRECTION LEFT-LESS = 1 RIGHT-MORE = 0 | DIGITAL AZIMUTH CALCULATE VS COUNTS DEAD BAND >20 = 1 <20 = 0 |
| 1 TO 31 | = | | 0 | | | | | |
| 1 TO 31 | = | | 1 | | | | | |
| 1 TO 31 | = | | | | | | | |
| 1 TO 31 | = | | | | | | | |
| 1 TO 31 | = | | | | | | | |
| 1 TO 31 | = | | | | | | | |
| 1 TO 31 | = | | | | | | | |
| 32 TO 63 | = | | | | | | | |
| 32 TO 63 | = | | | | | | | |
| 32 TO 63 | = | | | | | | | |
| 32 TO 63 | = | | | | | | | |
| 32 TO 63 | = | | | | | | | |
| 32 TO 63 | 1 TO 31 | | | | | | | |
| 64 TO 71 | = | | | | | | | |
| 72 TO 79 | = | | | | | | | |
| 80 TO 87 | = | 0-1 | | | | | | |
| 80 TO 87 | = | 0 | | | | | | |
| 80 TO 87 | = | 1 | | | | | | |
| 80 TO 87 | = | 0 | | | | | | |
| 80 TO 87 | = | 0-1 | | | | | | |
| 80 TO 87 | = | 0-1 | 1 | | | | | |
| 80 TO 87 | = | 0-1 | 0 | | | | | |
| 80 TO 87 | = | 0-1 | | | | | | |
| 88 TO 91 | = | | | | | | | |
| 88 TO 91 | = | | | | | | | |
| 88 TO 91 | = | | | | | | | |
| 92 TO 93 | = | | | | | | 1 | 1 |

-continued

| STATE NUMBERS | | | | | | | |
|---|---|---|---|---|---|---|---|
| 92 TO 93 | = | | | | | 1 | |
| 94 | = | | | | | | |
| 94 | = | | | | | | |
| 94 | = | | | | | | |
| 94 | = | | | | | | |
| 95 | = | | | | | | |
| 95 | = | | | | | | |
| 95 | = | | | | | | |
| 95 | = | | | | | | |
| 96 TO 111 | = | | | | | | |
| 96 TO 111 | = | | | | | | |
| 112 TO 119 | = | | | | | | |
| 120 TO 123 | = | | | | | | |
| 124 TO 125 | = | | | | | 0-1 | 1 |
| 124 TO 125 | = | | | | | | |
| 126 TO 127 | = | | | | | | |
| 126 TO 127 | = | | | | | | |

| | STATE INPUTS FROM SENSORS AND ENCODERS | | | | | |
|---|---|---|---|---|---|---|
| | 485 | | 485 | | 485 | |
| | DIGITAL ELEVATION | | DIGITAL AZIMUTH | | DIGITAL AZIMUTH | |
| STATE NUMBERS | CALCULATE VS COUNTS DIRECTION UP-LESS = 1 DOWN-MORE = 0 | CALCULATE VS COUNTS DEAD BAND >20 = 1 <20 = 0 | SCADA VS COUNTS DIRECTION LEFT-LESS = 1 RIGHT-MORE = 0 | SCADA VS COUNTS DEAD BAND >20 = 1 <20 = 0 | SCADA VS COUNTS DIRECTION UP-LESS = 1 DOWN-MORE = 0 | SCADA VS COUNTS DEAD BAND >20 = 1 <20 = 0 |
| 1 TO 31 = | | | | | | |
| 1 TO 31 = | | | | | | |
| 1 TO 31 = | | | | | | |
| 1 TO 31 = | | | | | | |
| 1 TO 31 = | | | | | | |
| 1 TO 31 = | | | | | | |
| 1 TO 31 = | | | | | | |
| 32 TO 63 = | | | | | | |
| 32 TO 63 = | | | | | | |
| 32 TO 63 = | | | | | | |
| 32 TO 63 = | | | | | | |
| 32 TO 63 = | | | | | | |
| 32 TO 63  1 TO 31 | | | | | | |
| 64 TO 71 = | | | | | | |
| 72 TO 79 = | | | | | | |
| 80 TO 87 = | | | | | | |
| 80 TO 87 = | | | | | | |
| 80 TO 87 = | | | | | | |
| 80 TO 87 = | | | | | | |
| 80 TO 87 = | | | | | | |
| 80 TO 87 = | | | | | | |
| 80 TO 87 = | | | | | | |
| 80 TO 87 = | | | | | | |
| 88 TO 91 = | | | | | | |
| 88 TO 91 = | | | | | | |
| 88 TO 91 = | | | | | | |
| 92 TO 93 = | 1 | 1 | 1 | 1 | 1 | 1 |
| 92 TO 93 = | 1 | | 1 | | 1 | |
| 94 = | | | | | | |
| 94 = | | | | | | |
| 94 = | | | | | | |
| 94 = | | | | | | |
| 95 = | | | | | | |
| 95 = | | | | | | |
| 95 = | | | | | | |
| 95 = | | | | | | |
| 96 TO 111 = | | | | | | |
| 96 TO 111 = | | | | | | |
| 112 TO 119 = | | | | | | |
| 120 TO 123 = | | | | | | |
| 124 TO 125 = | 0-1 | 1 | 0-1 | 1 | 0-1 | 1 |
| 124 TO 125 = | | | | | | |
| 126 TO 127 = | | | | | | |
| 126 TO 127 = | | | | | | |

-continued

| | | ANALOG VOLTAGE | | ANALOG VOLTAGE | | CONTROLLER OUTPUTS | | |
|---|---|---|---|---|---|---|---|---|
| | | DIGITAL AZIMUTH | | DIGITAL AZIMUTH | | NONE | 125VAC AZIMUTH DRIVE | 125VAC |
| STATE NUMBERS | | SUN SENSOR DIRECTION LEFT V+ = 1 RIGHT V− = 0 | SUN SENSOR DEAD BAND >2 MV = 1 <MV = 0 | SUN SENSOR DIRECTION UP V+ = 1 DOWN V− = 0 | SUN SENSOR DEAD BAND >2 MV = 1 <MV = 0 | LIMIT HARD PLUG IN = 1 PLUG OUT = 0 | DIRECTION R–S flip flop 10 Sec Delay CCWT = 1 CWT = 0 | ON-OFF On = 1 Off = 0 |
| 1 TO 31 | = | | | | | 1 | 0 | 1 |
| 1 TO 31 | = | | | | | 1 | 1 | 1 |
| 1 TO 31 | = | | | | | | | |
| 1 TO 31 | = | | | | | | | |
| 1 TO 31 | = | | | | | | | |
| 1 TO 31 | = | | | | | | | |
| 1 TO 31 | = | | | | | | | |
| 32 TO 63 | = | | | | | 1 | 1 | 1 |
| 32 TO 63 | = | | | | | | | |
| 32 TO 63 | = | | | | | | | |
| 32 TO 63 | = | | | | | | | |
| 32 TO 63 | 1 TO 31 | | | | | | | |
| 64 TO 71 | = | | | | | 1 | | |
| 72 TO 79 | = | | | | | | | |
| 80 TO 87 | = | | | | | 1 | | |
| 80 TO 87 | = | | | | | 1 | 1 | 1 |
| 80 TO 87 | = | | | | | 1 | 0 | 1 |
| 80 TO 87 | = | | | | | 1 | | |
| 80 TO 87 | = | | | | | 1 | | |
| 80 TO 87 | = | | | | | 1 | 1 | 1 |
| 80 TO 87 | = | | | | | 1 | 0 | 1 |
| 80 TO 87 | = | | | | | 1 | | |
| 88 TO 91 | = | | | | | 1 | | |
| 88 TO 91 | = | | | | | 1 | | |
| 88 TO 91 | = | | | | | 1 | | |
| 92 TO 93 | = | | | | | 1 | 1 | 1 |
| 92 TO 93 | = | | | | | 1 | 1 | |
| 94 | = | 1 | 1 | 1 | 1 | 1 | 1 | 1 |
| 94 | = | 1 | | 1 | | 1 | 1 | |
| 94 | = | | 1 | | 1 | 1 | | 1 |
| 94 | = | | | | | 1 | | |
| 95 | = | | | | | 1 | 1 | 1 |
| 95 | = | | | | | 1 | 1 | |
| 95 | = | | | | | 1 | | 1 |
| 95 | = | | | | | 1 | | |
| 96 TO 111 | = | | | | | 1 | | |
| 96 TO 111 | = | | | | | 1 | | |
| 112 TO 119 | = | | | | | 1 | | |
| 120 TO 123 | = | | | | | | | |
| 124 TO 125 | = | | | | | 1 | | 1 |
| 124 TO 125 | = | | | | | 1 | | |
| 126 TO 127 | = | 0-1 | 1 | 0-1 | 1 | 1 | 0-1 | 1 |
| 126 TO 127 | = | 0-1 | 0 | 0-1 | 0 | 1 | | |

| | | CONTROLLER OUTPUTS | | | | | | | |
|---|---|---|---|---|---|---|---|---|---|
| | | NONE | 125VAC ELEVATION DRIVE | 125VAC | | 485 | 485 | 485 | 125VAC |
| STATE NUMBERS | | LIMIT HARD PLUG IN = 1 PLUG OUT = 0 | DIRECTION R–S flip flop 10 Sec Delay UP = 1 DOWN = 0 | ON-OFF On = 1 Off = 0 | 125VAC FOCUS BLOWER ON = 1 OFF = 0 | ENGINE RUN SUN RUN = 1 STOP = 0 | CLOSE RECEIVER APERATURE CLOSE = 1 OPEN = 0 | RUN ENGINE ON FUEL RUN = 1 STOP = 0 | MASTER POWER OFF ON = 1 OFF = 0 |
| 1 TO 31 | = | 1 | | | 0 | 0 | 1 | 0 | 1 |
| 1 TO 31 | = | 1 | | | 0 | 0 | 1 | 0 | 1 |
| 1 TO 31 | = | 1 | 0 | 1 | 0 | 0 | 1 | 0 | 1 |
| 1 TO 31 | = | 1 | 0 | 1 | 0 | 0 | 1 | 0 | 1 |
| 1 TO 31 | = | 1 | 0 | | 0 | 0 | 1 | 0 | 1 |
| 1 TO 31 | = | 1 | 0 | 1 | 0 | 0 | 1 | 0 | 1 |
| 1 TO 31 | = | | | | 0 | 0 | 1 | 0 | 1 |
| 32 TO 63 | = | 1 | | | 0 | 0 | 1 | 0 | 1 |
| 32 TO 63 | = | 1 | 0 | 1 | 0 | 0 | 1 | 0 | 1 |
| 32 TO 63 | = | 1 | 0 | | 0 | 0 | 1 | 0 | 1 |
| 32 TO 63 | = | 1 | 0 | 1 | 0 | 0 | 1 | 0 | 1 |
| 32 TO 63 | = | | | | | | 1 | 1 | 1 |

-continued

| | | | | | | | | | |
|---|---|---|---|---|---|---|---|---|---|
| 32 TO 63 | 1 TO 31 | | | | | | 1 | 0 | 1 |
| 64 TO 71 | = | 1 | | | 0 | 0 | 1 | 0 | 1 |
| 72 TO 79 | = | | | | | | 1 | | 1 |
| 80 TO 87 | = | 1 | 1 | 1 | 0 | 0 | 1 | 0 | 1 |
| 80 TO 87 | = | | | | 0 | 0 | 1 | 0 | 1 |
| 80 TO 87 | = | | | | 0 | 0 | 1 | 0 | 1 |
| 80 TO 87 | = | 1 | 0 | 1 | 0 | 0 | 1 | 0 | 1 |
| 80 TO 87 | = | 1 | | | | | 1 | 0 | 1 |
| 80 TO 87 | = | | | | 0 | 0 | 1 | 0 | 1 |
| 80 TO 87 | = | | | | 0 | 0 | 1 | 0 | 1 |
| 80 TO 87 | = | 1 | | | 0 | 0 | 1 | 0 | 1 |
| 88 TO 91 | = | 1 | 1 | 1 | 0 | 0 | 1 | 0 | 1 |
| 88 TO 91 | = | 1 | 1 | 1 | 0 | 0 | 1 | 0 | 1 |
| 88 TO 91 | = | 1 | 1 | 1 | 0 | 0 | 1 | 0 | 1 |
| 92 TO 93 | = | 1 | 1 | 1 | 0 | 0 | 1 | 0 | 1 |
| 92 TO 93 | = | 1 | 1 | | | | | | 1 |
| 94 | = | 1 | 1 | 1 | | | | | 1 |
| 94 | = | 1 | 1 | | 1 | 1 | | | 1 |
| 94 | = | 1 | | 1 | | | | | 1 |
| 94 | = | 1 | | | 1 | 1 | | | 1 |
| 95 | = | 1 | 1 | 1 | | | | | 1 |
| 95 | = | 1 | 1 | | 1 | 1 | | | 1 |
| 95 | = | 1 | | 1 | | | | | 1 |
| 95 | = | 1 | | | 1 | 1 | | | 1 |
| 96 TO 111 | = | 1 | | | 0 | | 1 | 1 | 1 |
| 96 TO 111 | = | 1 | | | 0 | | 1 | 0 | 1 |
| 112 TO 119 | = | 1 | | | 0 | | 1 | 1 | 1 |
| 120 TO 123 | = | | | | 0 | | 1 | 1 | 1 |
| 124 TO 125 | = | 1 | | 1 | 0 | | 1 | 1 | 1 |
| 124 TO 125 | = | 1 | | | 0 | | 1 | 1 | 1 |
| 126 TO 127 | = | 1 | 0-1 | 1 | 0 | | 1 | 1 | 1 |
| 126 TO 127 | = | 1 | | | 0 | | 1 | 1 | 1 |

In general, fault and override conditions lead to the system shutting down and stowing. If the system is focused, a delay is incorporated to allow the system to defocus before it starts slewing toward a stow position. This prevents damage to the collector system from a focused beam off-track.

Face-down stow introduces some complications to the algorithms. In the embodiment shown in FIG. 1, there is only one azimuth location at which the system can be allowed to stow face-down. Therefore, when the system is commanded to stow, it is brought to the azimuth stow position with the elevation above the horizon before it is allowed to go down further. If the arm latch doesn't operate properly, or if the azimuth drive is faulted, the system is stowed face-up to avoid damage from trying to stow face-down at the wrong azimuth.

The system may run on alternative energy sources such as gas at any time, whether solar operation is enabled or not, except when the system is in a faulted condition. In local mode, gas operation is controlled by a switch closure on the local control pendant, but in other modes, gas operation is simply commanded via the SCADA system.

SYSTEM EXAMPLE

The following example of an embodiment of the invention is provided for illustration.

Referring again to FIG. 1, multiple solar collector systems 44 may be connected to a serial network over which commands are received from the operator terminal 35 and status information is transmitted to the operator terminal 35 from multiple solar collector systems 44. Serial data transmission is provided.

Stirling Engine Communications

A dedicated serial connection connects the dish controller and the Stirling engine controller. A serial connection comes from the Stirling engine controller and is connected to the computer network 39 at the user station 33. Electrical isolation between the Stirling engine controller and the dish system controller and the dish controller and the serial link to the Stirling computer network 39 is provided.

Electrical Power Input

The solar collector system 44 accepts and supplies alternating current ("AC") power as follows:

| Nominal | Low Limit | High Limit |
|---|---|---|
| 460VAC | 368VAC | 529VAC |
| Frequency | Phase Rotation | Current |
| 57-63 Hz | A-B-C | 30A nominal |

The grid protection panel 49 is equipped with relays that will disconnect the system from the grid if the voltage, frequency, or phase rotation deviate from proper values. The grid protection box shall also disconnect if the current to or from the solar collection system 44 exceeds 45 A per system (I 50% of 30 A nominal current).

Input Controls

The basic commands from the user are as follows:
Enable/disable solar operation
Set solar operation mode (calculated sun tracking, sun tracking using sun sensor, tracking to peak power output)
Enable/disable operation on fuel
Change system parameters (including clock updates)

Outputs and Indicators

A serial network carries all operational outputs from the dish controllers in the network. The dish controller stores data about system operation on a five-minute basis that can be downloaded by the user at user terminal 35. Similarly, the network controller stores weather data, including wind speed and direction and allow that data to be downloaded by the user. The dish and network controller also provide their current status in real time upon request by the user or user interface program at the user terminal 35.

Manual Controls and Indicators

For debugging and other purposes, manual controls are provided as follows:

Manual "Scram" button on the outside of the control box and near the operator's console, which disconnects power to the drive motors, focusing device, and gas solenoid valve Manual 115 VAC circuit breakers accessible from outside the power box, to individually control the following components:
Azimuth drive motor power
Elevation drive motor power
Focusing device power
Gas solenoid
Scram contactor
General-purpose outlet
Power to uninterruptible power supply
Uninterruptible power supply output to Stirling engine system
Uninterruptible power supply output to dish control system Manual dish movement system that bypasses and disconnects the dish controller outputs and allows the dish to be moved manually using a control pendant with hand switches for the azimuth and elevation motors. The manual control pendant will also include switches for the scram contactor, the focusing device 21, a speed control relay (for future use), and the gas solenoid switch for test purposes.

Manual 460VAC disconnect switch accessible from the outside of the power box to turn off the power supply from the utility grid 49 to the power box 27.

Modes of Operation

The solar collector system is capable of being operated in solar or gas operating modes, or if both are disabled, the system shall proceed to face-down stow and remain there. In solar mode, the system functions automatically when the sun elevation exceeds a set value, track the sun using either a sun-sensor or calculated sun position, and will focus and produce power in response to the level of insolation. The system stows automatically if high winds occur and are detected, or at the end of the day when the sun goes down. If gas operation is enabled, the system will operate using fuel within a defined period of the day (from a start time to an end time, specified by the user). If solar and gas are both enabled, then during the allowed gas operation period the system will operate on gas whenever the solar insulation is insufficient for focusing and solar operation.

Alarms/Faults

When the system detects a fault condition, it performs one or more of the following actions, depending on the type of fault. Status and warning messages may be displayed on the screen of the user interface computer. The system may cease all solar and gas operation and stow itself upon detecting a fault condition, and remains idle in a stowed position until operation is re-enabled by the operator. If the system is operating on-sun at the time of the fault, it will continue to track during the defocus delay period, then proceed to downward stow, i.e., a position where the collector surface faces the ground/earth in a face down arrangement. If the fault is in one of the drive motors, the system will not try to operate the faulted motor, but will move to a safe position if it can (face-up/face-down or feathered to the wind). In case of a high-wind condition, the system will stow face-up and feathered 90 degrees to the wind, or will return to face-down stow if that position is closer.

Table 2 summarizes the fault responses of the system.

TABLE 2 summarizes the fault responses of the system

| Fault: | Response: |
|---|---|
| Any, except high wind | Stop running on gas; disable solar operation; defocus, then stow |
| High Wind | Stow face-up, feathered 90 degrees to wind (unless below horizon to start with); continue to run on gas if enabled |
| Azimuth Motor | Stow face-up at present azimuth (unless at azimuth stow position) |
| Elevation Motor | Move to azimuth stow position at present elevation |

As previously discussed, in solar collector concentrator systems, for example, of the type employing a Stirling engine, if the Stirling engine is selected to be of the type which operates at maximum capacity most of the time for the type of solar concentrator involved, it is often the case at certain times of the day that the engine exceeds its maximum safe operating temperature, prompting its engine controller to shut it down. Thus, as may be appreciated, such an engine includes a controller inside of it that also monitors temperature, and upon exceeding a certain temperature, the controller declares a fault at that point. In the event of shutdown, the system begins to operate on negative power, i.e., the system would begin to draw power from a network or grid to which it is connected.

Prior to being able to start the system again, it must be allowed to cool down.

One way to avoid system shutdown while still maintaining operation may be implemented, as previously discussed, in the case where the concentrator is of the type that includes a plurality of variable focus mirrors, such as described with the previously-referenced SunDish™ system. Individual flexible mirrors or flexible facets of a single mirror can be focused with a blower which draws a vacuum or otherwise modifies pressure between the membranes to employ a more fine-tuned focusing.

In accordance with the system and method described herein, a first predetermined temperature is set which is lower than the maximum temperature which the Stirling engine can reach prior to shutting down. The system is configured so that the temperature sensor and engine controller sends temperature information to the system controller 51 such that when the temperature in the engine reaches that first predetermined temperature, the blower 19 is caused to shut off the mirrors or mirror facets to defocus. This can be done either by setting the engine controller to provide an indication to the system controller 51 that the first predetermined temperature has been reached or at the system controller 51 which may receive continuous temperature information from the engine controller and implements a compare function with the engine temperature to determine when the first predetermined temperature has been reached.

During this time, the engine continues to receive reflected sunlight, but not in a completely focused mode, and as a result begins to cool. The system controller 51 or engine controller is also programmed to have a second predetermined temperature point which is lower than the first predetermined temperature point such that when and as the engine 11 cools, when the temperature thereof reaches the second predetermined temperature, the blower 19 is then turned back on by the system controller 51 to refocus the system.

Typically by defocusing the mirrors slightly over a 30-second to one-minute time period, the flux profile or the amount of energy going into the engine 11 might drop 10% to 15%, for example. By modulating the focus, the engine and system is allowed to run throughout the entire day.

As noted, in a specific implementation, the temperature levels for the first predetermined temperature and second predetermined temperatures can be programmed into the engine controller so that signals are sent when each level is reached to the system controller 51, and the system controller 51 can then cause the focus blower 19 to either focus or defocus the dish 17.

Thus, in the case of a system like that referred to previously as the SunDish™ system, a concentrator may be employed which includes 16 round, stretched membrane mirror facets, with a total reflective area of 118 square meters. A typical engine configuration might be an engine such as is available from STM Corporation of Ann Arbor, Michigan which runs at 2200 r.p.m. and drives a standard three-phase motor/generator at 1800 r.p.m. through a reduction gear train. With such a system, operating on solar energy input, power is regularly produced in excess of 20 kilowatts. In this case, the first predetermined temperature point at which defocusing begins to occur may be set, for example, at about 770° C. It is important to appreciate that the first predetermined point for the temperature at which time defocusing occurs is desirably set such as to be sufficiently low that any latency in the beginning of the cool down of the engine, i.e., engine temperature continues to increase for a short period even though defocusing has occurred due to continued heat input, does not result in the engine reaching the shut down temperature. Thus, even though the temperature may continue to climb even after defocusing occurs, at no time is there a danger that it reaches the maximum operating temperature at which the system shuts down.

Similarly, the second predetermined temperature may be set at about 10% to 15% below the value of the first predetermined temperature. The second predetermined temperature may be selected so as to avoid excessive cycling on and off of the blower, and at the same time to be not so low that system efficiency is so adversely impacted that the operation becomes unworkable.

Thus, referring again to FIG. 5, the system may be implemented specifically as illustrated by block 217. The system controller 51 is capable of modulating the amount of solar energy delivered to the energy conversion device during operation. This can be used to match the incoming solar energy to the capabilities of the energy conversion device or to allow the system to "load follow" in a stand alone configuration where the system controller 51 is feeding a load alone. The operation of this is achieved through the "PCS ready" signal from the energy conversion device 11 as shown in block 217 of FIG. 5. Thus, rather than indicating a PCS fault from the energy conversion device 11, the "ready" states indication can be dropped when the first predetermined temperature is reached and the system controller 51 can then cause defocusing of the concentrator or dish 17.

When the energy conversion device 11 is again able to accept more energy, it raises the PCS "ready" signal, and the system controller 51 refocuses the dish 17 to increase the amount of solar energy to the energy conversion device 11.

The cycle period of modulation of the focus is controlled by the energy conversion device 11, depending on its time constant and power conversion capabilities.

Figure 6:
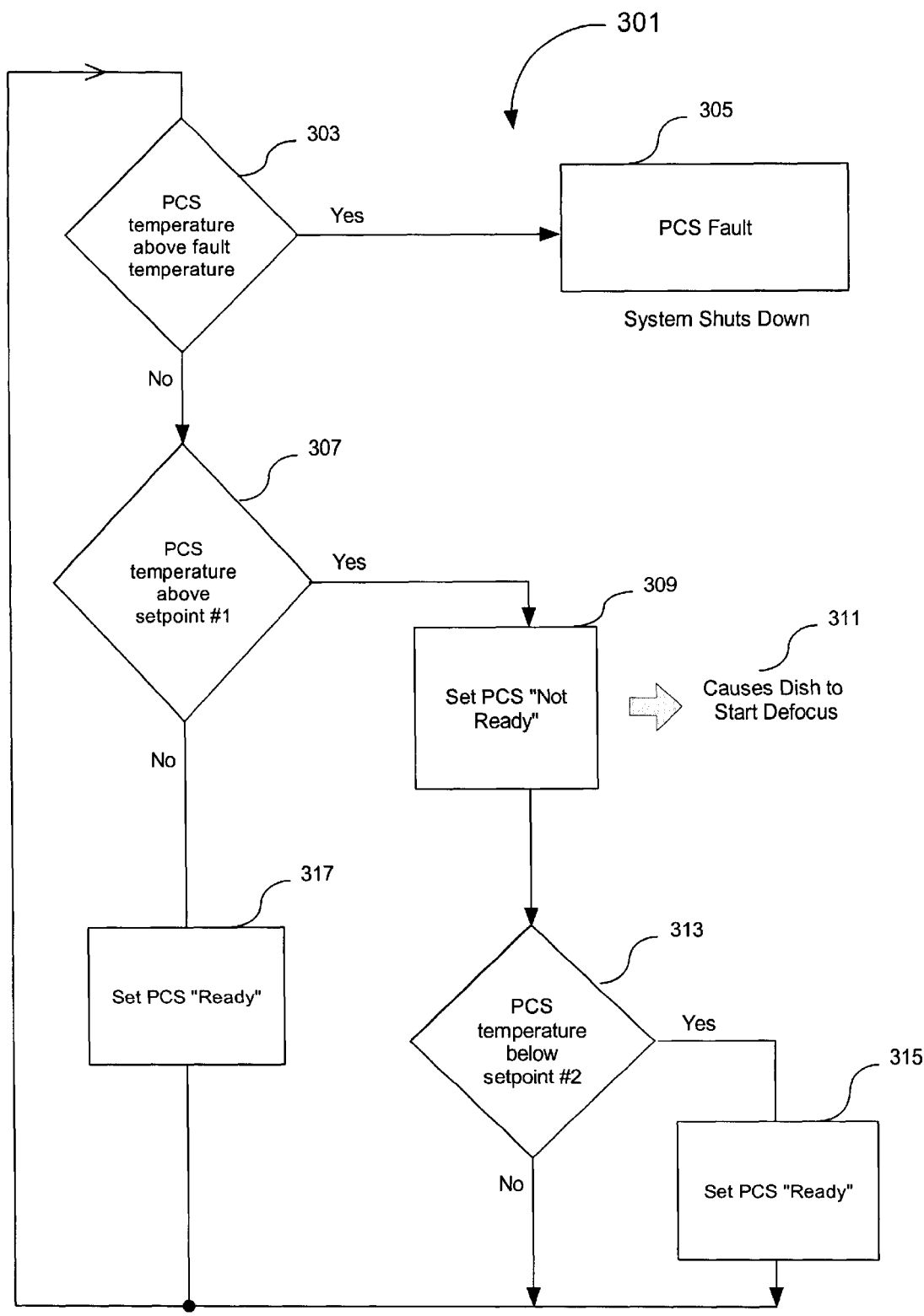
FIG. 6 is a flowchart showing how operation of an energy conversion device on the system is controlled based on its level of operation, as indicated, for example, by temperature.

Thus, as discussed previously, one implementation can be a stretched membrane concentrator with a thermal engine where defocusing is accomplished by turning off the focus blower, and a specific implementation is further illustrated by the flow chart of FIG. 6. More specifically, in accordance with FIG. 6, in flow chart 301, at step 303, a determination is made if the power conversion system temperature is above its fault temperature. If the answer is yes, at step 305 the system shuts down. If the temperature is not above the fault temperature, then at step 307 a determination is made whether the PCS temperature is above the first predetermined temperature or setpoint. If the answer is yes, the conversion device controller from block 217 indicates that the engine is not in a ready state, and at step 311 causes the system controller 51 to defocus the dish 19. At step 313 if the temperature reaches below setpoint number two, then at step 315 the PCS controller indicates a ready step, and the program returns to step 303. If the answer is no, similarly the program returns to step 303.

If the answer to the inquiry at step 307 was that the PCS temperature was not above the setpoint number one, or first predetermined setpoint, the PCS controller sets a PCS ready signal at step 317 as an input from block 217 of FIG. 5, and the program returns to step 303 and continues to loop throughout the entire operation in the manner described.

It will be important to appreciate that while a great deal of details have been given in the context of the use of flexible membrane mirrors and a Stirling engine, that such a system could also be implemented with a fixed focus concentrator as previously discussed, where one or more facets of the concentrator can be moved so as remove solar energy when a defocus is desired. As discussed, this can be implemented in the form of pivotable mirrors having individual motors associated therewith such as servo-actuated motors which can be controlled from the system controller 51.

Alternatively, it is possible that the energy conversion device 11 can be a photovoltaic array of cells and the defocus could be triggered not just by overheating of the cells, but by a sensing of too high an electrical output for the cells or other components.

It was previously discussed that the system can be implemented in a load-following environment. In such a system, a single system supplies an isolated load, as opposed to a grid or a network. Such a load might be a remote lighting system, and if the load were less than the available capacity of the system to produce power at a given time, modulation of the input is done to spill out excess solar power. Thus, focus modulation can, for example, be controlled by monitoring the voltage level in the output and the system is focus modulated to maintain the voltage within a desired range and to prevent damage to the load components from overvoltage.

As would be understood by one of ordinary skill in the art, the system and method described herein and depicted in FIGS. 1–6 is an example of a solar collection system. Alternative embodiments of such a solar collection may be implemented without departing from the essential characteristics or the spirit of the invention.

Having thus described the invention, the same will become better understood from the appended claims in which it is set forth in a non-limiting manner.

What is claimed is:

1. A system for controlling a solar concentrator, comprising a solar concentrator having at least one mirror;

an energy conversion device associated with the solar concentrator for having sunlight reflected from the at least one mirror focused thereon;

means for focusing and defocusing at least one mirror of said solar concentrator on said energy conversion device said means for focusing and defocusing comprising a blower;

a sensor for monitoring the operation of said energy conversion device to provide an output indicative of whether the amount of solar energy focused on the energy conversion device is at a maximum amount at which the energy conversion device is to operate;

a controller system for controlling operation of the solar concentrator, the at least one mirror, and the energy conversion device, said controller system being further configured for comparing the output of said sensor with a first predetermined value below the value indicative of the maximum amount at which the energy conversion device is to operate, for having said means for focusing and defocusing the at least one mirror to defocus the at least one mirror to cause the output of said sensor to fall below said first predetermined value; and said controller system being further configured for comparing the output of said sensor with a second predetermined value below said first predetermined value for having said means for focusing and defocusing the at least one mirror refocus the at least one mirror on said energy conversion device.

2. The system of claim 1, wherein said at least one mirror comprises multiple mirrors which are flexible membrane mirrors, and said comprising a blower for causing said flexible membrane mirrors to focus and defocus incident sunlight on said energy conversion device depending on its operation.

3. The system of claim 2, wherein said energy conversion device is a Stirling engine, said sensor is a temperature sensor, and said means for focusing and defocusing further comprising a blower controller for causing said blower to turn on and off in response to signals from said controller system generated in response to the output received from the temperature sensor.

4. The system of claim 1, wherein said first predetermined value is set at a level sufficiently low to avoid the energy conversion device reaching a level of operation exceeding the maximum level of operation at which it can operate.

5. The system of claim 3, wherein said first predetermined temperature value is set at about 770° C., and said second predetermined temperature value is set at about 10–15 percent below said first predetermined value.

6. The system of claim 1, wherein said multiple mirrors are fixed focus mirrors mounted on said solar concentrator in a manner in which they can be moved to a position in which reflected solar energy is not fully focused on said energy conversion device.

7. The system of claim 6, wherein said means for focusing and defocusing further comprises moving means for moving at least one of said multiple mirrors between at least two positions, a first position in which at least one of said multiple mirrors focuses reflected solar radiation on the energy conversion device, and a second position in which said at least one of said multiple mirrors does not fully focus reflected solar radiation on said energy conversion device.

8. The system of claim 7, wherein said energy conversion device is a Stirling engine, said sensor is a temperature sensor, and said controller system is connected for having said moving means move at least one of said multiple mirrors into said second position when the sensed temperature reaches the first predetermined value, and into said first position when the sensed temperature reaches the second predetermined value after said at least one mirror having been moved into said second position.

9. The system of claim 2, wherein said energy conversion device comprises a photovoltaic device.

10. The system of claim 6, wherein said energy conversion device comprises a photovoltaic device.

11. The system of claim 9, wherein said sensor is a voltage sensor, and said means for focusing and defocusing comprises a blower controller for causing said blower to turn on and off in response to signals from said controller system generated in response to the output received from the voltage sensor.

12. The system of claim 10, wherein said sensor is a voltage sensor, and said means for focusing and defocusing further comprises moving means for moving at least one of said multiple mirrors between at least two positions, a first position in which at least one of said multiple mirrors focuses reflected solar radiation on the energy conversion device, and a second position in which said at least one of said multiple mirrors does not fully focus reflected solar radiation on said energy conversion device.

13. The system of claim 12, wherein said controller system is connected for having said moving means move at least one of said multiple mirrors into said second position when the sensed voltage reaches the first predetermined value, and into said first position when the sensed voltage reaches the second predetermined value after said at least one mirror has been moved into said second position.

14. A system for controlling a solar concentrator of the type having at least one flexible membrane mirror, an energy conversion device associated with the solar concentrator for having sunlight reflected from the at least one flexible membrane mirror focused thereon, and a blower for focusing said flexible membrane mirror, comprising:

a temperature sensor for monitoring the temperature of an energy conversion device having sunlight focused thereon by the at least one flexible membrane mirror on a solar concentrator;

an energy conversion device controller for controlling operation of said energy conversion device and for comparing the temperature of said energy conversion device with a first predetermined temperature below a set maximum overheating temperature at which said energy conversion device's operation shuts down, and for issuing a control signal for having operation of a blower focusing said at least one flexible membrane mirror shut down to cause defocusing of said at least one flexible membrane mirror; and said energy conversion device controller being further configured for comparing the temperature of the energy conversion device with a second predetermined temperature below said first predetermined temperature for issuing a signal for having the blower turned back on to refocus the at least one flexible membrane mirror when the temperature of the energy conversion device matches said second predetermined temperature.

15. The system of claim 14, wherein said first predetermined temperature is set at a level sufficiently low to allow said defocusing to occur over a time period without having the energy conversion device reach said set maximum temperature.

16. The system of claim 14, wherein said energy conversion device is a Stirling engine.

17. The system of claim 14, further comprising:
- a drive mechanism including motor assembles for positioning said solar concentrator relative to the sun;
- at least one concentrator associated with said concentrator;
- a concentrator controller for receiving inputs from said sensors, from said temperature sensor, for receiving commands from an external source, and executing instructions based on the state of the system.

18. A method of controlling a solar concentrator system including a solar concentrator with at least one mirror for focusing reflected sunlight on an energy conversion device, an energy conversion device associated with the solar concentrator, the method comprising:
- providing means for focusing and defocusing reflected sunlight from said at least one mirror on the energy conversion device said means for focusing and defocusing comprision a blower;
- monitoring the level of operation of the energy conversion device, with the energy conversion device having a predetermined maximum level of operation at which the energy conversion device is to operate;
- determining if the level of operation of the energy conversion device has reached a first predetermined level of operation below the maximum level of operation at which it is to operate;
- if the level of operation of the energy conversion reaches said first predetermined level, defocusing said at least one mirror to reduce the intensity of reflected light directed onto the energy conversion device while maintaining the energy conversion device in operation;
- monitoring the level of operation of the energy conversion device while said at least one mirror is defocused to determine if the level of operation of the energy conversion devices reaches a second predetermined level lower than the first predetermined level; and
- if the level of operation reaches the second predetermined level, refocusing said at least one mirror.

19. The method of claim 18, wherein the energy conversion device is a Stirling engine, and the monitoring comprises monitoring the temperature of the Stirling engine.

20. The method of claim 19, wherein said concentrator system comprises a plurality of flexible membrane mirrors, and said blower focusing the mirrors when in operation, and wherein said mirrors are focused and defocused by turning the blower on and off.

* * * * *